B. SLUSSER.

Assignor, by mesne assignments, to F. B. HUNT, J. B. FISHER and A. McCALLUM.

Sulky-Plow.

No. 7,973. Reissued Nov. 27, 1877.

Witnesses
Fred. G. Dietrich.
Geo. Dunn

Inventor
Benjamin Slusser
by
A. McCallum,
atty.

N. PETERS. PHOTO-LITHOGRAPHER, WASHINGTON, D. C.

UNITED STATES PATENT OFFICE.

BENJAMIN SLUSSER, OF SIDNEY, OHIO, ASSIGNOR, BY MESNE ASSIGNMENTS, TO F. B. HUNT, J. B. FISHER, AND A. McCALLUM.

IMPROVEMENT IN SULKY-PLOWS.

Specification forming part of Letters Patent No. 80,427, dated July 28, 1868; Reissue No. 6,563, dated July 27, 1875; Reissue No. 7,973, dated November 27, 1877; application filed November 3, 1877.

*To all whom it may concern:*

Be it known that I, BENJAMIN SLUSSER, of Sidney, in the county of Shelby and State of Ohio, have invented certain new and useful Improvements in Sulky-Plows; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
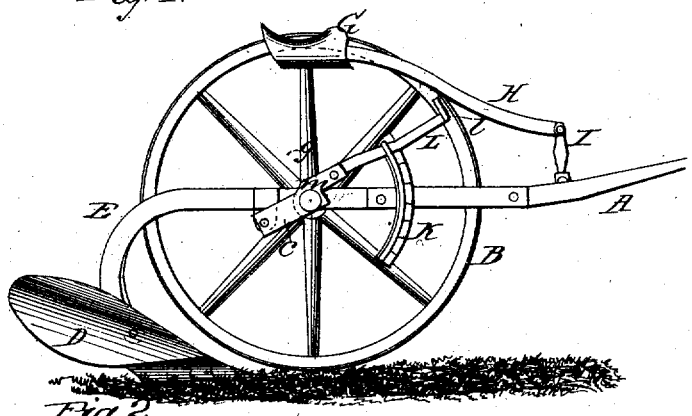
Figure 2:
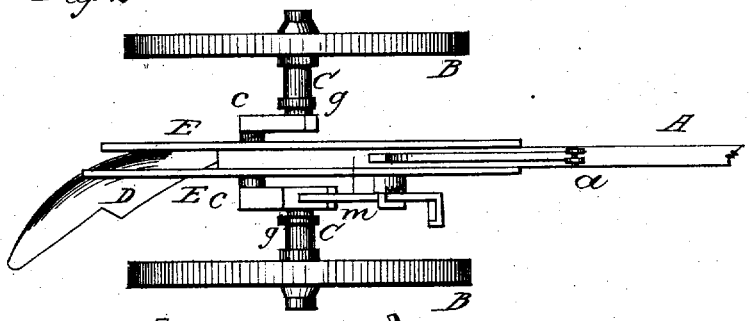
Figure 3:
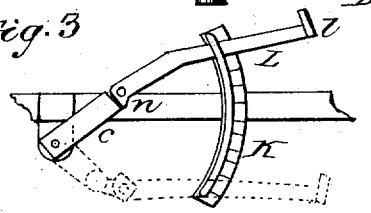

Figure 1 is an elevation of the right side, the right wheel being removed. Fig. 2 is a plan, the seat being removed; and Fig. 3 is a detail view of the right axle-crank and operating-lever, with its connections for lifting and adjusting the plow.

The object of this invention is to simplify the construction of sulky-plows, so as greatly to reduce their cost, while yet enabling them to be capable of easy operation, of ready adjustment, and of yielding to obstacles without breaking.

In the drawings, A represents the draft-pole; B B, the supporting-wheels; C, the axle-tree, which is provided with a double crank, *c*, at its center; D, the mold-board and E curved iron standards pivoted to the axle, and one attached to each side of the draft-pole, and extending from its rear end back, then down, and then, at their lower ends, slightly forward, where they are bolted to the rear side of the mold-board near its forward edge, supporting it in the manner clearly shown in Figs. 1 and 2. G is the driver's seat, supported upon arched standards, which are pivoted to the axle just outside of either arm of the crank *c*, as shown at *g g*, and steadied in its position by a rod, H, which extends forward from the top of the standards, and is hinged to a short vertical post, I, which itself is hinged to the upper side of the pole A, so that as the crank *c* rises or falls, the seat G always maintains its proper position, the movement of the post I counterbalancing the movement of the crank. In Fig. 2 the seat G is removed.

From the forward or inner extremity of one of the crank-arms a projection, *m*, extends forward slightly beyond the line of the axle C, and has a lever, L, hinged to it and extending forward, terminating in a foot-rest, *l*, and working in a ratchet-guide, K, by which it can be confined at any elevation, and which causes it to travel up and down in a vertical path. The lever has a shoulder, *n*, which sits against the square end of the projection *m* when the lever-handle is thrown down, and thus forces the part *m* down with the lever and throws the crank *c* up, elevating the plow-beam and the rear end of the pole A, which is supported upon the crank, and thus raising the plow out of the ground.

On the other hand, there is nothing in the nature of the joint by which the lever L is hinged to the part *m* to prevent the rear end of the crank from being thrown up without raising the lever. Thus, when the forward end of the lever is fastened by the rack K, if the plow should strike an obstacle, it will rise, throwing up the crank without detaching the lever from its notch in the rack, and again, when the obstacle has been passed, dropping to its proper position. The device thus works easily and automatically, without danger of breaking.

Having thus described my invention, what I claim as new, and desire to secure by Letters Patent, is—

1. In a sulky-plow, the combination of a crank-axle and plow-beam, or frame of the plow, the latter being hinged or loosely pivoted to the former, so as to permit the plow to rise and fall, substantially as and for the purpose specified.

2. In a sulky-plow, the combination of a crank-axle, plow-beam, and lever, the latter operating to raise and lower the plow when required, but without interfering with its independent movement, substantially as set forth.

3. In a sulky-plow, the plow supported by means of a beam, bent as described, and a crank-axle mounted on wheels, the beam being pivoted to the crank, so as to move therewith, substantially as and for the purpose specified.

4. The seat G, supported on standards pivoted to the axle, as described, and connected with the draft-pole by means of the rod H and hinged post I, so that the seat will always be maintained in proper position, substantially as set forth.

5. In a sulky-plow having a crank-axle and a vertically-adjustable plow attached to the crank, so as to move with it, a driver's seat arranged and combined therewith, and which maintains its vertical position without being affected by the movement of the crank and plow, substantially as and for the purpose specified.

In testimony that I claim the foregoing I have hereunto set my hand this 27th day of October, 1877.

BENJAMIN SLUSSER.

Witnesses:
H. WILSON,
W. D. DAVIES.